US012745239B2

(12) United States Patent
Wu et al.

(10) Patent No.: US 12,745,239 B2
(45) Date of Patent: Sep. 22, 2026

(54) CROSS LAYER IMPROVEMENT WITH RADIO LINK CONTROL FEEDBACK ON PHYSICAL LAYER

(71) Applicant: QUALCOMM Incorporated, San Diego, CA (US)

(72) Inventors: Liangming Wu, Beijing (CN); Changlong Xu, Beijing (CN); Jian Li, Shanghai (CN); Kangqi Liu, San Diego, CA (US); Xipeng Zhu, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 499 days.

(21) Appl. No.: 17/999,927

(22) PCT Filed: May 26, 2021

(86) PCT No.: PCT/CN2021/095954

§ 371 (c)(1),
(2) Date: Nov. 27, 2022

(87) PCT Pub. No.: WO2022/007530

PCT Pub. Date: Jan. 13, 2022

(65) Prior Publication Data

US 2023/0239867 A1 Jul. 27, 2023

(51) Int. Cl.

*H04W 72/1268* (2023.01)
*H04L 5/00* (2006.01)

(52) U.S. Cl.

CPC ....... *H04W 72/1268* (2013.01); *H04L 5/0055* (2013.01)

(58) Field of Classification Search

CPC ............. H04W 72/1268; H04L 5/0055; H04L 1/1848; H04L 1/1854; H04L 1/1896; H04L 1/1861

(Continued)

(56) References Cited

U.S. PATENT DOCUMENTS 10,149,175 B2 12/2018 Kim et al.
10,411,864 B2 9/2019 Wang et al.

(Continued)

FOREIGN PATENT DOCUMENTS

CN 102387009 A 3/2012
CN 105684501 A 6/2016

(Continued)

OTHER PUBLICATIONS

International Search Report and Written Opinion—PCT/CN2020/101195—ISA/EPO—Apr. 12, 2021.
International Search Report and Written Opinion—PCT/CN2021/095954—ISA/EPO—Aug. 19, 2021.

(Continued)

*Primary Examiner* — Mang Hang Yeung

(74) *Attorney, Agent, or Firm* — Patterson & Sheridan, L.L.P.

(57) ABSTRACT

Certain aspects of the present disclosure provide techniques for cross layer improvement with radio link control feedback on physical layer. In aspects, a method performed by a user equipment (UE) includes receiving a radio link control (RLC) packet; and transmitting, in response to the RLC packet, an RLC acknowledgment (ACK) or an RLC negative acknowledgment (NACK) on a pre-configured uplink resource associated with the RLC packet.

30 Claims, 16 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2004/0240423 | A1 | 12/2004 | Anttila | |
| 2011/0136495 | A1* | 6/2011 | Chen | H04L 5/0053 455/450 |
| 2011/0267999 | A1* | 11/2011 | Kuwahara | H04L 65/80 370/310 |
| 2012/0314648 | A1 | 12/2012 | Zhang et al. | |
| 2014/0177542 | A1* | 6/2014 | Novak | H04W 72/23 370/329 |
| 2017/0064771 | A1 | 3/2017 | Manepalli et al. | |
| 2017/0339599 | A1* | 11/2017 | Wu | H04W 28/0864 |
| 2018/0343583 | A1* | 11/2018 | Shan | H04L 1/1864 |

FOREIGN PATENT DOCUMENTS

| | | | |
|---|---|---|---|
| CN | 105897385 | A | 8/2016 |
| CN | 106160951 | A | 11/2016 |
| EP | 3065449 | A1 | 9/2016 |
| EP | 3387775 | A1 | 10/2018 |
| EP | 3535893 | A4 | 6/2020 |
| GB | 2554661 | A | 4/2018 |
| WO | 2011126242 | A2 | 10/2011 |
| WO | 2013042885 | A1 | 3/2013 |
| WO | 2018144990 | | 8/2018 |
| WO | 2020093230 | | 5/2020 |
| WO | 2020103011 | A1 | 5/2020 |

OTHER PUBLICATIONS

Supplementary European Search Report—EP21838422—Search Authority—The Hague—Apr. 8, 2024.

* cited by examiner

1204

RECEIVE, IN RESPONSE TO THE RLC PACKET, AN RLC ACKNOWLEDGMENT (ACK) OR AN RLC NEGATIVE ACKNOWLEDGMENT (NACK) ON A PRE-CONFIGURED UPLINK RESOURCE ASSOCIATED WITH THE RLC PACKET

1300

| | | | | | | | |
|---|---|---|---|---|---|---|---|
| **Window1-Slot1** | **Window1-Slot2** | **Window2-Slot3** | **Window2-Slot4** | **Window3-Slot5** | **Window3-Slot6** | **Window4-Slot7** | **Window4-Slot8** |
| UE1 | UE2 | UE3 | UE4 | UE5 | UE6 | UE7 | UE8 |

FIG. 13

CROSS LAYER IMPROVEMENT WITH RADIO LINK CONTROL FEEDBACK ON PHYSICAL LAYER

PRIORITY CLAIMS

This application is a national stage application under 35 U.S.C. 371 of PCT/CN2021/095954 filed May 26, 2021, which claims priority to International Application No. PCT/CN2020/101195 filed Jul. 10, 2020, which are assigned to the assignee of the present application and are expressly incorporated by reference herein in their entireties.

BACKGROUND

Field

Aspects of the present disclosure relate to wireless communications, and more particularly, to techniques for radio link control (RLC) feedback, on the physical (PHY) layer, for transmissions.

Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved feedback on the RLC layer and improved utilization of physical uplink control channel (PUCCH) resources.

Certain aspects of the subject matter described in this disclosure can be implemented in a method for wireless communication by a user equipment (UE). The method generally includes receiving a radio link control (RLC) packet; and transmitting, in response to the RLC packet, an RLC acknowledgment (ACK) or an RLC negative acknowledgment (NACK) on a pre-configured uplink resource associated with the RLC packet.

Certain aspects of the subject matter described in this disclosure can be implemented in a method for wireless communication by a base station (BS). The method generally includes transmitting a radio link control (RLC) packet; and receiving, in response to the RLC packet, an RLC acknowledgment (ACK) or an RLC negative acknowledgment (NACK) on a pre-configured uplink resource associated with the RLC packet.

Certain aspects of the subject matter described in this disclosure can be implemented in an apparatus for wireless communications. The apparatus generally includes: at least one processor configured to: receive a radio link control (RLC) packet; and transmit, in response to the RLC packet, an RLC acknowledgment (ACK) or an RLC negative acknowledgment (NACK) on a pre-configured uplink resource associated with the RLC packet; and a memory coupled with the at least one processor.

Certain aspects of the subject matter described in this disclosure can be implemented in an apparatus for wireless communications. The apparatus generally includes: at least one processor configured to: transmit a radio link control (RLC) packet; and receive, in response to the RLC packet, an RLC acknowledgment (ACK) or an RLC negative acknowledgment (NACK) on a pre-configured uplink resource associated with the RLC packet; and a memory coupled with the at least one processor.

Certain aspects of the subject matter described in this disclosure can be implemented in an apparatus for wireless communications. The apparatus generally includes means for receiving a radio link control (RLC) packet; and means for transmitting, in response to the RLC packet, an RLC acknowledgment (ACK) or an RLC negative acknowledgment (NACK) on a pre-configured uplink resource associated with the RLC packet.

Certain aspects of the subject matter described in this disclosure can be implemented in an apparatus for wireless communications. The apparatus generally includes means for transmitting a radio link control (RLC) packet; and means for receiving, in response to the RLC packet, an RLC acknowledgment (ACK) or an RLC negative acknowledgment (NACK) on a pre-configured uplink resource associated with the RLC packet.

Certain aspects of the subject matter described in this disclosure can be implemented in a computer-readable medium for wireless communications including instructions that, when executed by a processing system in a user equipment (UE), cause the processing system to perform operations including: receiving a radio link control (RLC) packet; and transmitting, in response to the RLC packet, an RLC acknowledgment (ACK) or an RLC negative acknowledgment (NACK) on a pre-configured uplink resource associated with the RLC packet.

Certain aspects of the subject matter described in this disclosure can be implemented in a computer-readable medium for wireless communications including instructions that, when executed by a processing system in a base station (BS), cause the processing system to perform operations including: transmitting a radio link control (RLC) packet; and receiving, in response to the RLC packet, an RLC acknowledgment (ACK) or an RLC negative acknowledgment (NACK) on a pre-configured uplink resource associated with the RLC packet.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 13 illustrates an example of staggering the feedback reporting of UEs, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
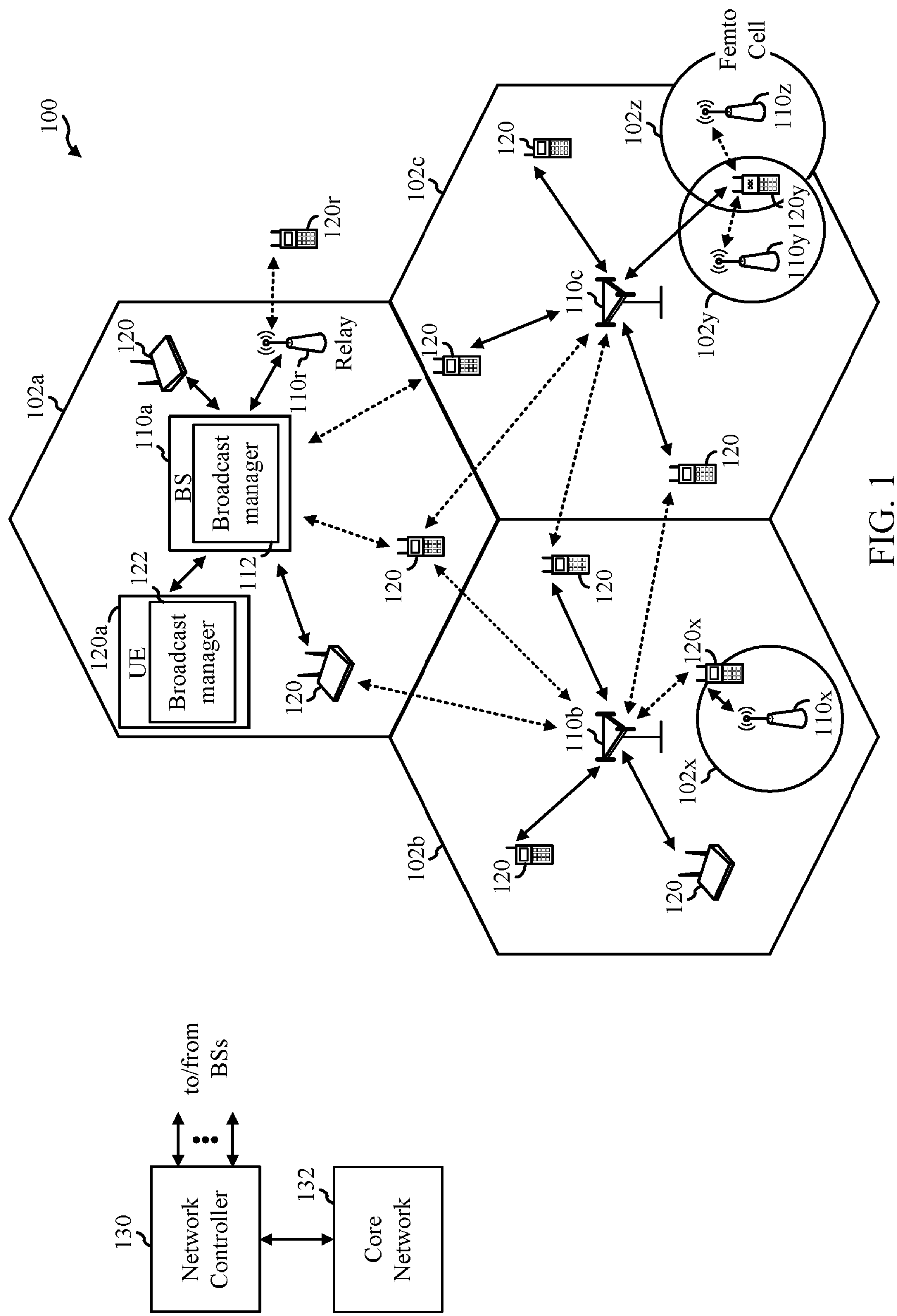
FIG. 1 is a block diagram conceptually illustrating an example wireless communication network, in accordance with certain aspects of the present disclosure.

Aspects of the present disclosure provide apparatus, methods, processing systems, and computer readable mediums for improving radio link control (RLC) feedback, on the physical (PHY) layer, for transmissions. According to aspects of the present disclosure, techniques used for broadcasting using long term evolution (LTE) radio access technology (RAT) do not support retransmission (e.g., when a recipient of the broadcast does not successfully decode a broadcast transmission) in the radio access network (RAN). That is, if a recipient of a broadcast misses a transmission or a packet, then the recipient must request a retransmission at higher layers (e.g., the application layer) of a protocol stack. In aspects of the present disclosure, broadcasting using a $5^{th}$ generation (5G) RAT may support retransmission in the 5G RAN to improve reliability and lower latency of the 5G broadcasts.

Though feasible, it may not be desirable or efficient to correct all errors that may occur in lower layers of the protocol stack, e.g., by using a hybrid automatic retransmission request (HARQ) technique. In unicast communications, RLC acknowledged mode (AM) is designed to correct the residual errors of lower layers, instead of correcting all errors at the lower layers. For example, a packet error rate (PER) of a single physical (PHY) layer transmission may be about 0.1. By comparison, the PER of a HARQ transmission (that is, a HARQ acknowledgment (ACK) or negative acknowledgment (NACK)) in PHY/MAC may be in the range 0.0001-0.001. Yet, the PER of RLC-AM may be in the range 0-0.000001. Thus, according to the present disclosure, using RLC retransmission for a multicast radio bearer (MRB) to correct the residual error of lower layers is more efficient.

The present disclosure provides techniques for cross layer optimization with RLC layer feedback on physical layer(s). The fast ACK/NACK feedback of RLC layer with cross layer optimization may reduce or simplify the complexity of RLC layer reporting processes. In some cases, pre-configured PUCCH is used. As a result, the PUCCH resource of the system may be saved or utilized efficiently by being only active when RLC layer decoding is possible, or by utilizing NACK only report. Other benefits or advantage may be understood in view of the technical details of the present disclosure.

According to aspects of the present disclosure, RLC-AM for unicast transmissions can be enhanced for MRB. For example, a user equipment (UE) or other recipient of a broadcast may send an RLC status report indicating lost packets over a unicast (e.g., using a cell radio network temporary identifier (C-RNTI) assigned to the UE) transmission, and the broadcaster (e.g., a base station BS) may retransmit the lost packets over either a broadcast (e.g., directed to a global radio network temporary identifier (G-RNTI)) or a unicast (e.g., directed to the C-RNTI) directed to the recipient that reported the lost packets. In aspects of the present disclosure, a sliding window based flow control may be used in acknowledging and retransmitting broadcast packets.

The following description provides examples of radio link control (RLC) feedback, on the physical (PHY) layer, for transmissions in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may include a UE 120 configured to perform operations 1100 of FIG. 11 to transmit, in response to an RLC packet received, an RLC feedback on a pre-configured uplink resource associated with the RLC packet. Similarly, the wireless network 100 may include a base station 110 configured to perform operations 1200 of FIG. 12 to transmit an RLC packet and receive an RLC feedback on a pre-configured uplink resource associated with the RLC packet.

As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

According to certain aspects, the BSs 110 and UEs 120 may be configured for radio link control (RLC) feedback, on the physical (PHY) layer, for transmissions. As shown in FIG. 1, the BS 110*a* includes a broadcast manager 112 that may transmit a radio link control (RLC) packet; and receive, in response to the RLC packet, an RLC acknowledgment (ACK) or an RLC negative acknowledgment (NACK) on a pre-configured uplink resource associated with the RLC packet, in accordance with aspects of the present disclosure. The UE 120*a* includes a broadcast manager 122 that receives a radio link control (RLC) packet; and transmits, in response to the RLC packet, an RLC acknowledgment (ACK) or an RLC negative acknowledgment (NACK) on a pre-configured uplink resource associated with the RLC packet, in accordance with aspects of the present disclosure.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells.

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE

120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
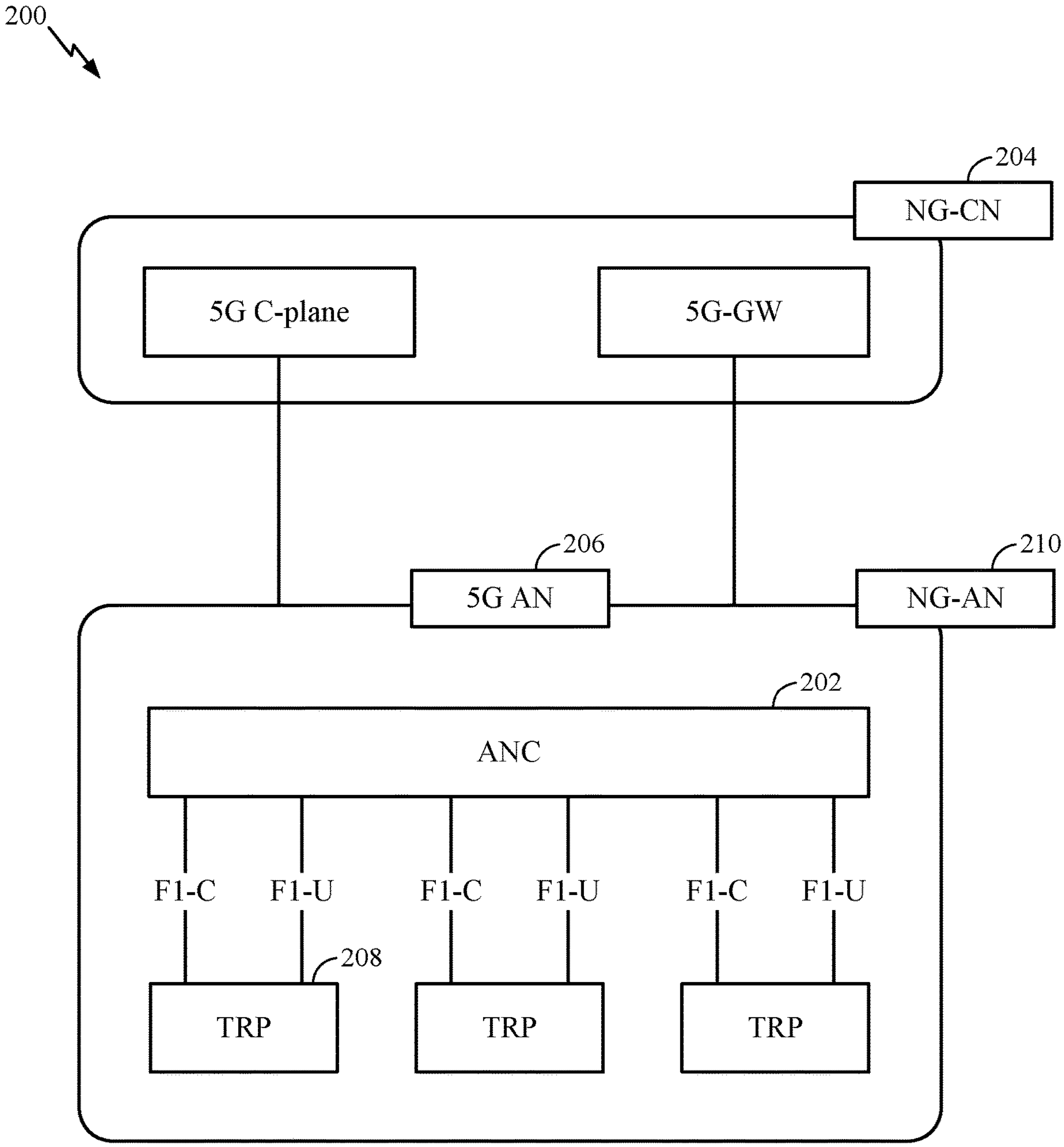
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with “cell.”

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed or present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
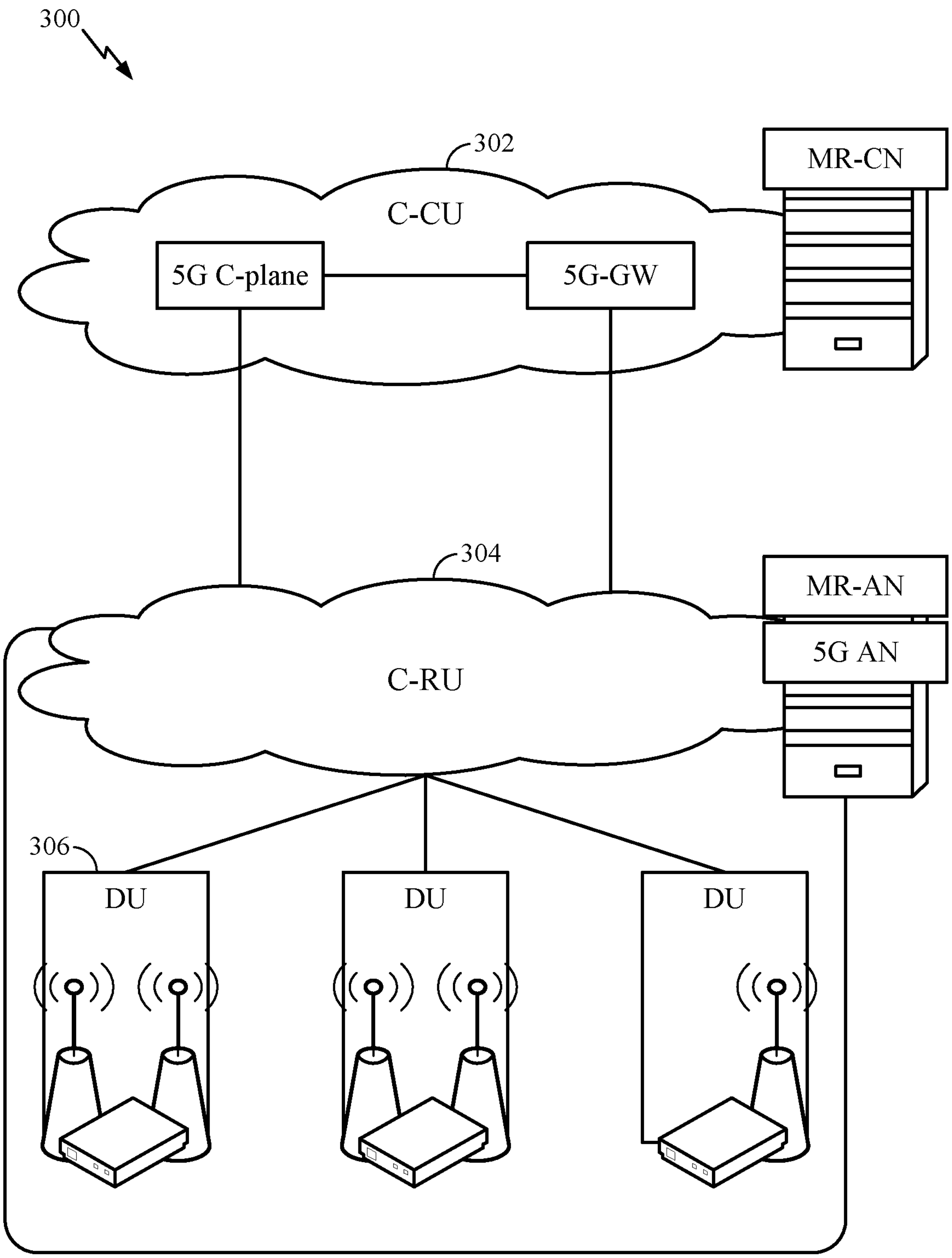
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
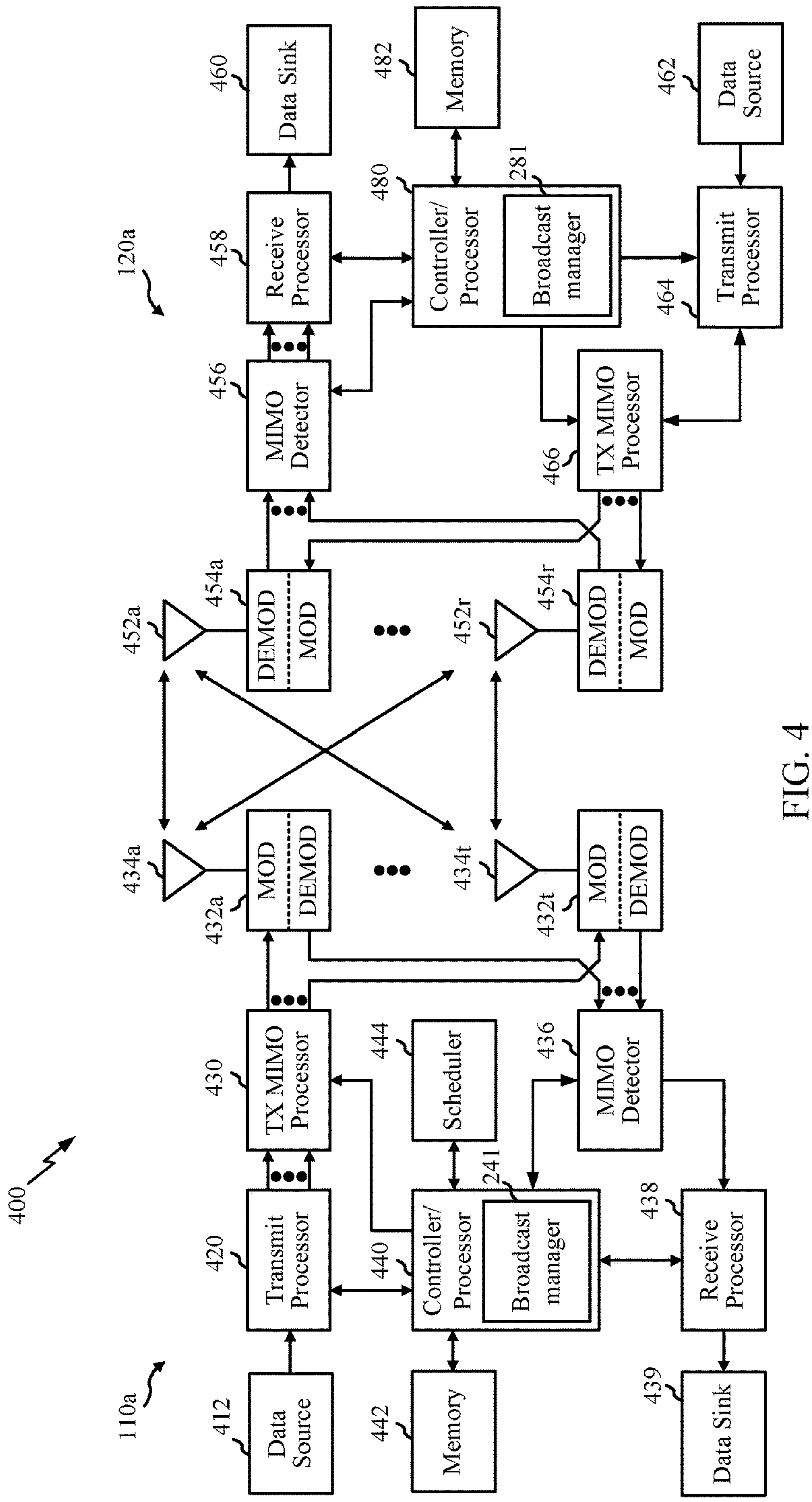
FIG. 4 is a block diagram conceptually illustrating a design of an example a base station (BS) and user equipment (UE), in accordance with certain aspects of the present disclosure.

FIG. 4 illustrates example components of BS 110*a* and UE 120*a* (e.g., the wireless communication network 100 of FIG. 1), which may be used to implement aspects of the present disclosure.

At the BS 110*a*, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 420 may process (e.g., encode and symbol map) the data and control information to obtain data symbols and control symbols, respectively. The transmit processor 420 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a*-432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a*-432*t* may be transmitted via the antennas 434*a*-434*t*, respectively.

At the UE 120*a*, the antennas 452*a*-452*r* may receive the downlink signals from the BS 110*a* and may provide received signals to the demodulators (DEMODs) in transceivers 454*a*-454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a*-454*r*, perform MIMO detection on the received symbols if applicable, and provide detected symbols. A receive processor 458 may process (e.g., demodulate, deinterleave, and decode) the detected symbols, provide decoded data for the UE 120*a* to a data sink 460, and provide decoded control information to a controller/processor 480.

On the uplink, at UE 120*a*, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the modulators in transceivers 454*a*-454*r* (e.g., for SC-FDM, etc.), and transmitted to the B S 110*a*. At the B S 110*a*, the uplink signals from the UE 120*a* may be received by the antennas 434, processed by the modulators 432, detected by a MIMO detector 436 if applicable, and further processed by a receive processor 438 to obtain decoded data and control information sent by the UE 120*a*. The receive processor 438 may provide the decoded data to a data sink 439 and the decoded control information to the controller/processor 440.

The memories 442 and 482 may store data and program codes for BS 110*a* and UE 120*a*, respectively. A scheduler 444 may schedule UEs for data transmission on the downlink and/or uplink.

Antennas 452, processors 466, 458, 464, and/or controller/processor 480 of the UE 120*a* and/or antennas 434, processors 420, 430, 438, and/or controller/processor 440 of the BS 110*a* may be used to perform the various techniques and methods described herein. For example, as shown in FIG. 4, the controller/processor 440 of the BS 110*a* has a broadcast manager 441 that transmits a radio link control (RLC) packet; and receives, in response to the RLC packet, an RLC acknowledgment (ACK) or an RLC negative acknowledgment (NACK) on a pre-configured uplink resource associated with the RLC packet, according to aspects described herein. As shown in FIG. 4, the controller/processor 480 of the UE 120*a* has an broadcast manager 481 that may receive a radio link control (RLC) packet; and transmit, in response to the RLC packet, an RLC acknowledgment (ACK) or an RLC negative acknowledgment (NACK) on a pre-configured uplink resource associated with the RLC packet, according to aspects described herein. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 5:
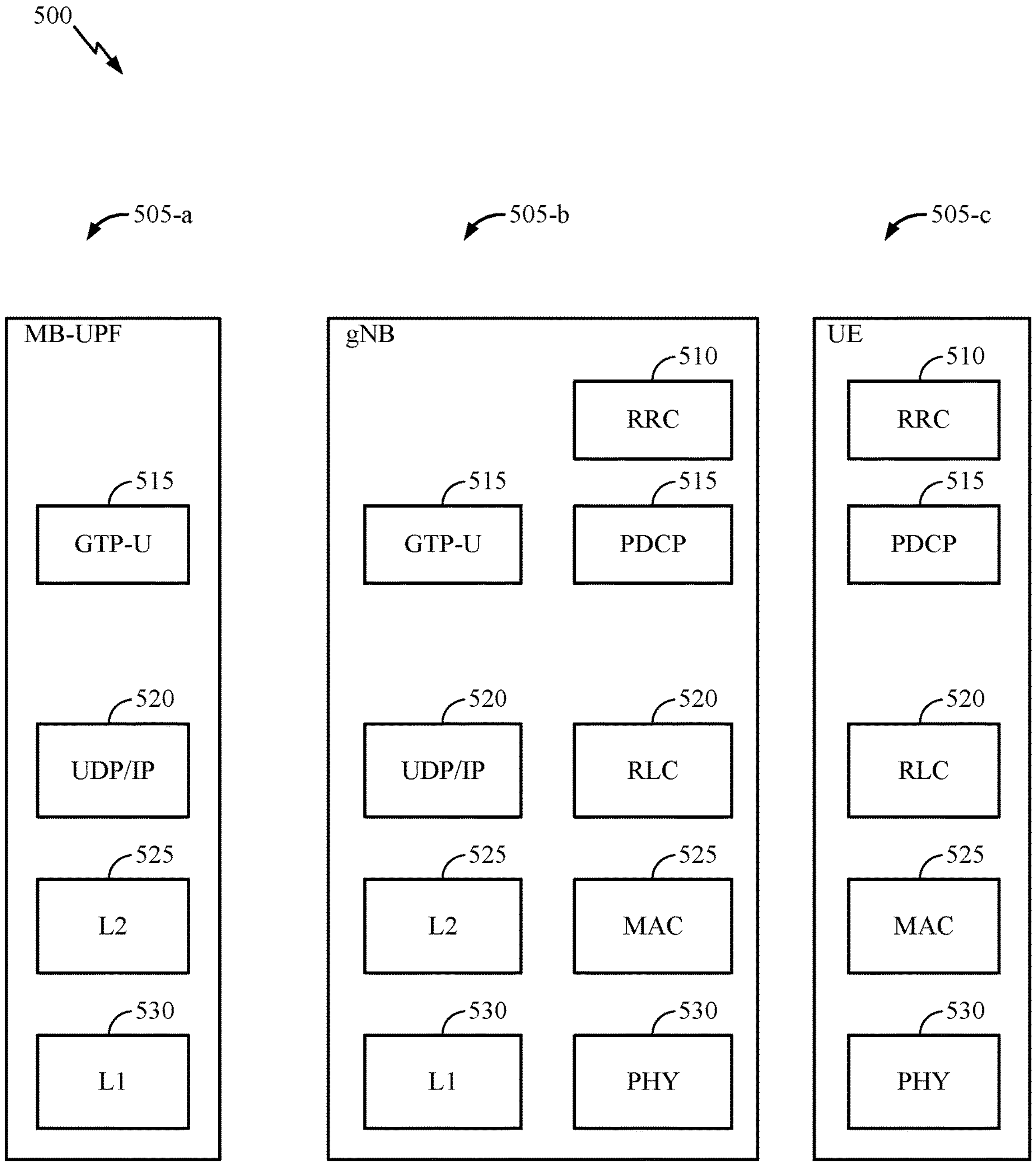
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows an implementation of a protocol stack in a multicast/broadcast user plane function (MB-UPF). In the MB-UPF 505-*a*, a general packet radio service (GPRS) tunneling protocol for user traffic (GTP-U) layer 515, a user datagram protocol/Internet protocol (UDP/IP) layer 520, a layer 2 (L2) 525, and a layer 1 (L1) 530 may be implemented by may be implemented by a central unit (e.g., C-RU 304, shown in FIG. 3) the DU. The first option 505-*a* may be useful in a macro cell, micro cell, or pico cell deployment.

A second option 505-*b* shows an implementation of a protocol stack, in which the protocol stack is implemented in a next generation Node-B (gNB) or the like. In the second option, the GTP-U layer 515 corresponds to a packet data convergence protocol (PDCP) layer 515 of the RAN, the UDP/IP layer 520 corresponds to the RLC layer 520 of the RAN, L2 525 corresponds to the MAC layer 525 of the RAN, and L1 530 corresponds to the PHY layer 530 of the RAN. In addition, a radio resource control (RRC) layer 510 may be implemented by the gNB. The second option 505-*b* may be useful in a femto cell deployment.

Regardless of whether a network access device implements part or all of a protocol stack, a UE may implement an entire protocol stack 505-*c* (e.g., the RRC layer 510, the PDCP layer 515, the RLC layer 520, the MAC layer 525, and the PHY layer 530).

Figure 6:
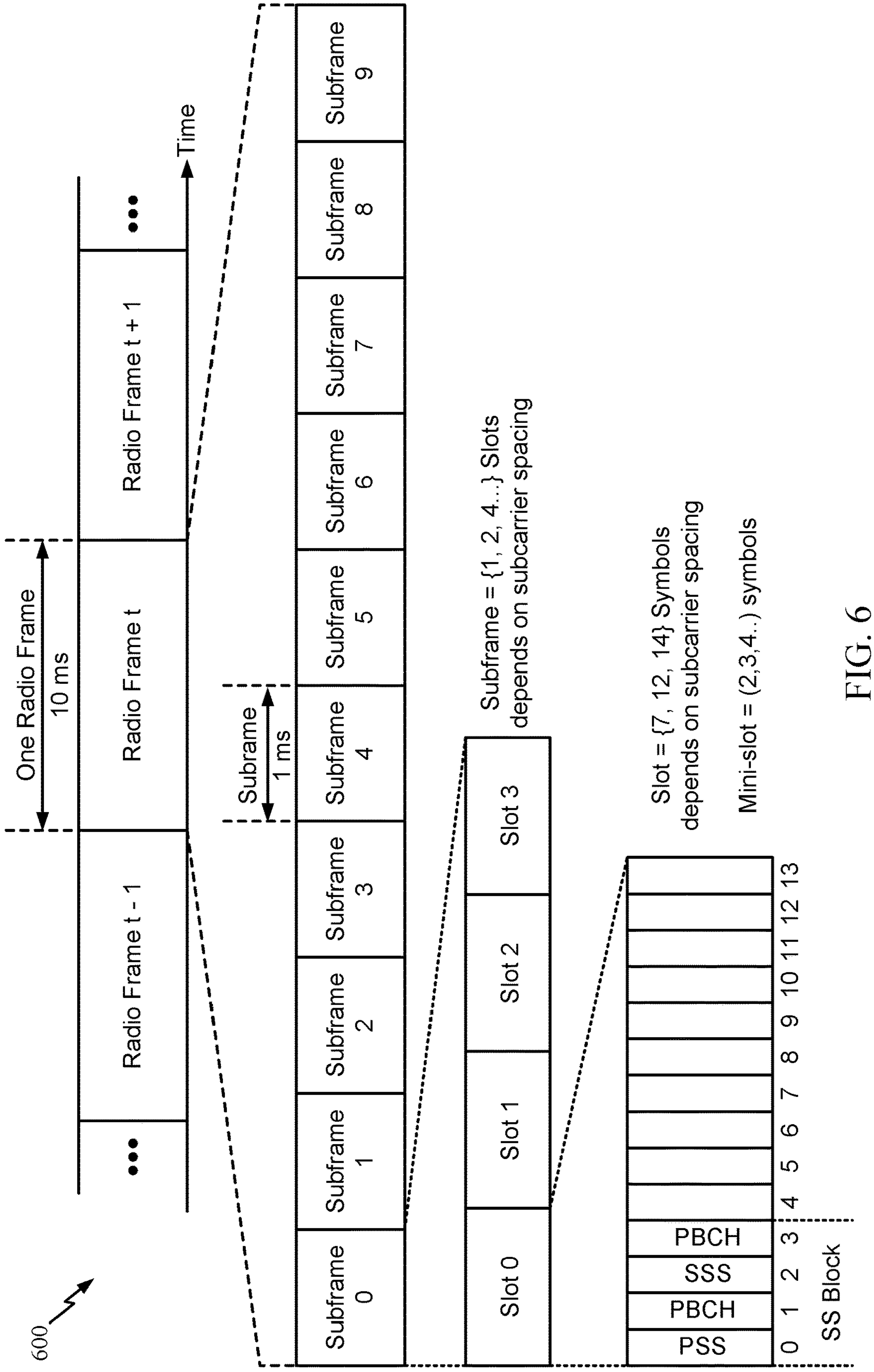
FIG. 6 is an example frame format for certain wireless communication systems (e.g., new radio (NR)), in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 7:
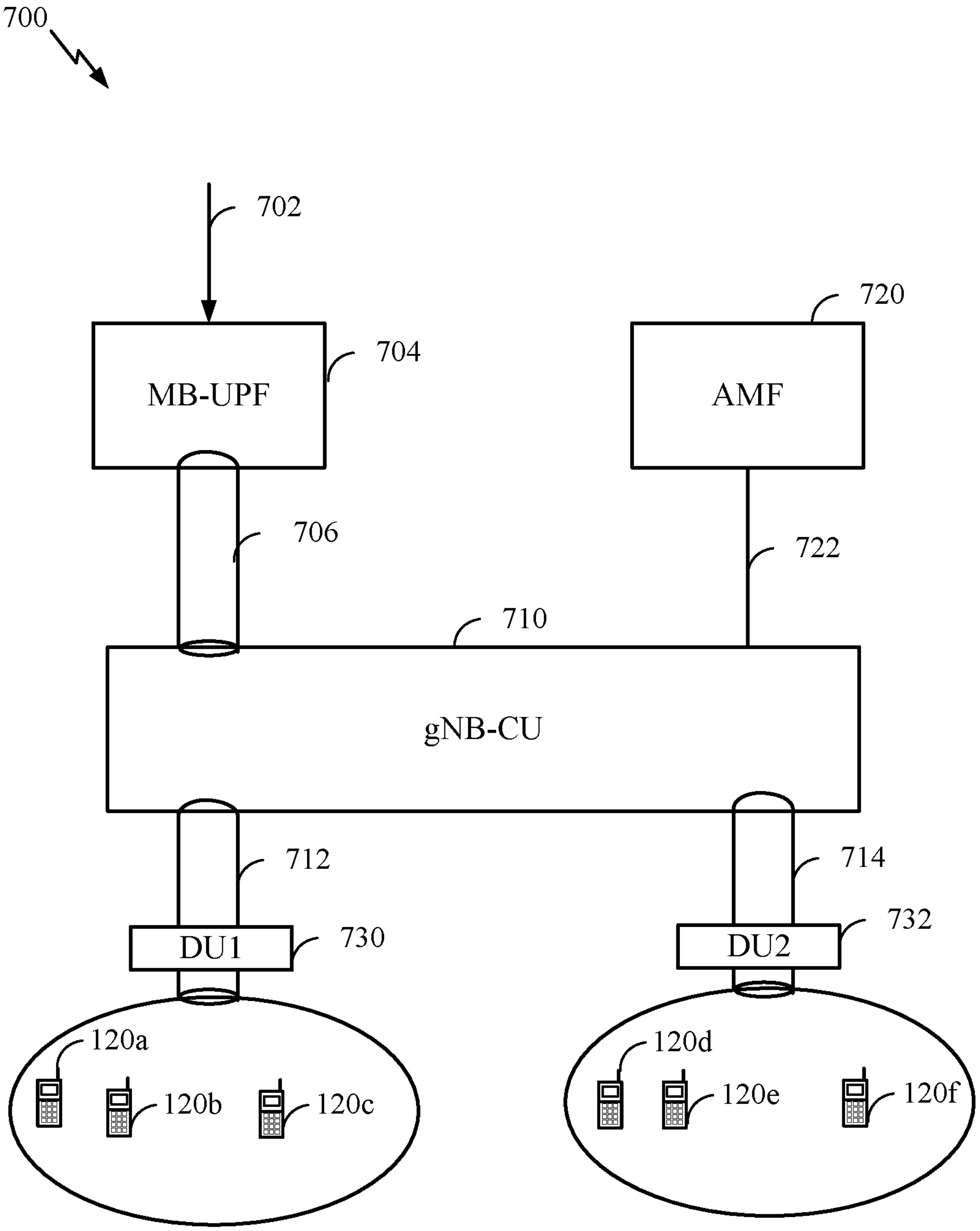
FIG. 7 shows an exemplary 5G broadcast system architecture 700, in accordance with aspects of the present disclosure.

FIG. 7 shows an exemplary 5G broadcast system architecture 700, in accordance with aspects of the present disclosure. A multicast/broadcast flow 702 (MB-Flow) is connected with a MB-UPF 704. The MB-UPF sends packets of the MB-Flow via a multicast/broadcast N3 (MB-N3) tunnel 706 to a gNB-CU 710. The MB-N3 tunnel may act as a user plane interface for MB-flow delivery over GTP. The gNB-CU connects to an AMF 720 via an N2 connection 722. The AMF may send control signaling controlling MB-Flow setup and modification (e.g., by indicating to the gNB-CU which UEs have permission to receive packets of the MB-Flow). The gNB-CU maps the packets of the MB-Flow via a first MRB 712 and a second MRB 714 or a DRB (not shown) to DUs 730 and 732. The DUs transmit packets of the MB-Flow to various UEs 120. The DUs also receive acknowledgments (ACKs) and negative acknowledgments (NACKs) from the various UEs and send those ACKs and NACKs to the CU, which in turn returns them to the MB-UPF, which forwards them on to higher layers.

According to aspects of the present disclosure, an LTE broadcast architecture may be described as LTE single cell point to multi-point (LTE SC-PTM). In LTE SC-PTM, a cell may transmit broadcasts via PDSCH that are addressed to a G-RNTI assigned to UEs that are intended recipients of the broadcasts.

In aspects of the present disclosure, fountain codes are rateless codes in the sense that the number of coded packets corresponding to a data packet is potentially limitless. Transmitted packets encoded using a fountain code can be recovered in a receiver as long as the number of received packets is slightly greater than the number of encoded source packets, no matter which transmitted packets are received. For example, the Luby transform (LT) code is the first fountain code used in wireless communications. In another example, the Raptor code is an enhancement of LT code.

In general, Fountain codes are called network codes in 3GPP, because fountain codes are applied in a network layer of a protocol stack. For example, in LTE, the Raptor code has been applied to multimedia broadcast and multicast service (MBMS) transmissions. Various fountain codes or network codes may be used for integrated access and backhaul applications. FIG. 7 illustrates the working principle of fountain codes.

As shown in the original generator matrix of FIG. 7 and in principle, fountain codes are rateless code with unlimited columns ($s_1$, $s_2$, . . . $s_{k-1}$, $s_k$) in time. According to aspects of the present disclosure, the transmitted packets of a fountain code may be determined by according to this equation:

$$p_j = \sum_{k=1}^{K} s_k G_{kj}$$

The recovered packets may be described according to this equation:

$$d_k = \sum_{n=1}^{N} p_n G_{nk}^{-1}$$

In aspects of the present disclosure, a condition for recovering the packets is that either $G_{nk}$ according to the received packets is invertible, or the rank of $G_{nk}$ is K Thus, in aspects of the present disclosure, a design rule for the original generator matrix of a fountain code is that $G_{nk}$ is invertible for a minimum N.

Figure 8:
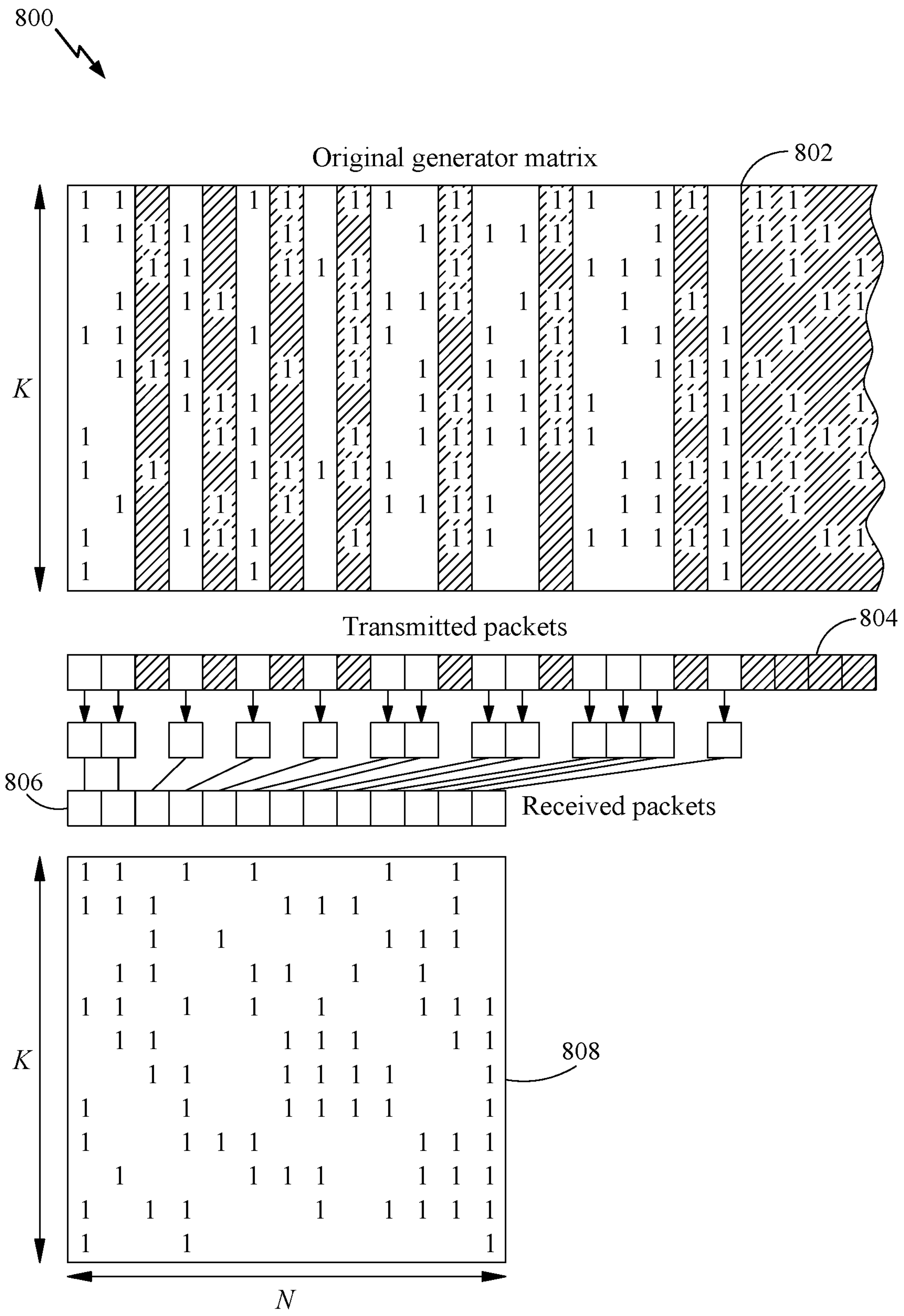
FIG. 8 is a diagram 800 illustrating an example fountain code.

FIG. 8 is a diagram 800 illustrating an example fountain code. An exemplary generator matrix 802 may include K rows. The transmitted packets are illustrated at 804. Packets that are successfully received and decoded are illustrated at 806. Data that a receiver can recover from the received packets is illustrated at 808. In some cases, the original generator matrix may start with a unit matrix.

According to aspects of the present disclosure, techniques used for broadcasting using long term evolution (LTE) radio access technology (RAT) do not support retransmission (e.g., when a recipient of the broadcast does not successfully decode a broadcast transmission) in the radio access network (RAN). That is, if a recipient of a broadcast misses a transmission or a packet, then the recipient must request a retransmission at higher layers (e.g., the application layer) of a protocol stack.

In aspects of the present disclosure, broadcasting using a $5^{th}$ generation (5G) RAT may support retransmission in the 5G RAN to improve reliability and lower latency of the 5G broadcasts. According to aspects of the present disclosure, it is not efficient to correct all errors that may occur in lower layers of the protocol stack, e.g. by using a hybrid automatic retransmission request (HARQ) technique. In unicast communication, RLC acknowledged mode (AM) is designed to correct the residual errors of lower layers, instead of correcting all errors at the lower layers. For example, a packet error rate (PER) of a single physical (PHY) layer transmission may be 0.1, while the PER of a HARQ transmission (that is, a HARQ acknowledgment (ACK) or negative acknowledgment (NACK)) in PHY/MAC may be in the range 0.0001-0.001. The PER of RLC-AM may be in the range 0-0.000001. Thus, it may be more efficient to use RLC retransmission for a multicast radio bearer (MRB) is used to correct the residual error of lower layers.

According to aspects of the present disclosure, RLC-AM for unicast transmissions can be enhanced for MRB. In aspects of the present disclosure, a user equipment (UE) or other recipient of a broadcast may send an RLC status report indicating lost packets over a unicast (e.g., using a cell radio network temporary identifier (C-RNTI) assigned to the UE) transmission, and the broadcaster (e.g., a base station BS) may retransmit the lost packets over either a broadcast (e.g., directed to a global radio network temporary identifier (G-RNTI)) or a unicast (e.g., directed to the C-RNTI) directed to the recipient that reported the lost packets. In aspects of the present disclosure, a sliding window based flow control may be used in acknowledging and retransmitting broadcast packets.

Accordingly, it is desirable to develop techniques and apparatus for radio link control (RLC) feedback, on the physical (PHY) layer, for transmissions.

Example Cross Layer Improvement with Radio Link Control Feedback on Physical Layer Aspects of the present disclosure provide techniques for radio link control (RLC) feedback, on the physical (PHY) layer, for transmissions.

In aspects of the present disclosure, a pre-configured uplink channel may carry ACK/NACK feedback for the RLC layer.

According to aspects of the present disclosure, a BS (e.g., a gNB) may configure an RLC layer maximum time for decoding. For example, a receiving device (e.g., a UE) is expected to complete the RLC layer decoding no later than $\Delta t$ ms after reception of the RLC packet encoded with a rateless code.

In aspects of the present disclosure, the MAC layer of a receiving device uses a pre-configured uplink resource (e.g., a PUCCH resource or a PUSCH resource) or a configured grant PUSCH for transmission of an ACK or NACK in response to the RLC transmission.

According to aspects of the present disclosure, the pre-configured uplink resource can be defined in a time frequency window that corresponds to the RLC layer decoding latency requirement or pattern. Defining the pre-configured uplink resource in the time frequency window that corresponds to the RLC layer decoding latency requirement may provide more flexibility of RLC layer decoding for different users.

In aspects of the present disclosure, each different RLC layer PDU flow may be assigned different pre-configured uplink resources.

According to aspects of the present disclosure, a receiving device (e.g., a UE) may receive an RLC packet and decode the RLC packet in no more time than $\Delta t$ (that is, in a configured maximum time for decoding).

In aspects of the present disclosure, a receiving device may transmit an ACK or a NACK in response to a received RLC packet on a pre-configured uplink resource (e.g., a PUCCH resource or a PUSCH resource) or a granted PUSCH resource.

According to aspects of the present disclosure, a BS (e.g., a gNB) may detect an ACK or NACK in response to transmitting an RLC packet from multiple pre-configured uplink resources (e.g., multiple uplink resources wherein each uplink resource corresponds to a UE intended to receive a broadcast RLC packet). In some such aspects, if one uplink resource is detected as an ACK, the BS may consider the whole RLC layer packet decoding as successful. In these aspects, if a NACK is detected, then a re-transmission process is triggered in the RLC layer of the BS.

In aspects of the present disclosure, pre-configured uplink resources may be configured for only NACK feedback. In such aspects, only a NACK is transmitted as feedback by a receiving device. In some such aspects, a BS (e.g., a gNB) may determine whether to trigger a re-transmission based on receiving NACKs from a threshold number of multiple UEs.

According to aspects of the present disclosure, multiple users (e.g., multiple UEs) can be allocated a same pre-configured uplink resource (e.g., a PUCCH resource or a PUSCH resource) for transmission of a NACK, in order to save the uplink resources by assigning fewer uplink resources than the number of receiving UEs.

Figure 9:
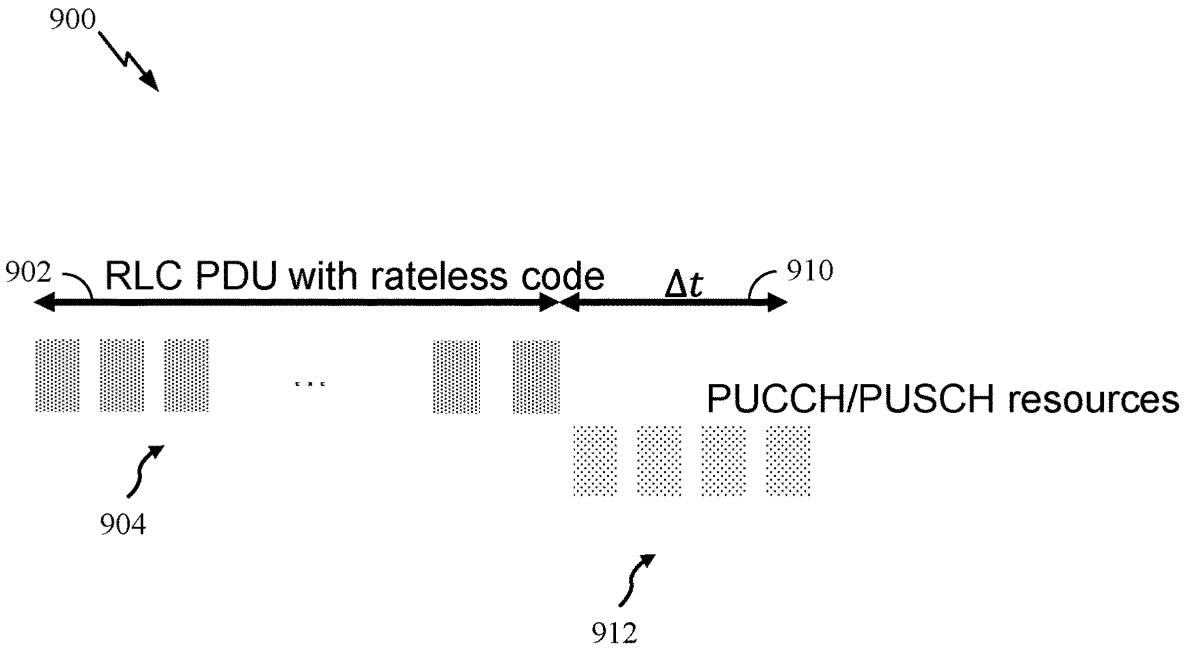
FIG. 9 is an exemplary transmission timeline, in accordance with aspects of the present disclosure.

FIG. 9 is an exemplary transmission timeline 900, in accordance with aspects of the present disclosure. In the exemplary transmission timeline, a BS (e.g., BS 110, shown in FIG. 1) transmits a plurality of RLC PDUs 904 with a rateless code at 902. In the exemplary transmission timeline, a UE (e.g., UE 120, shown in FIG. 1) is configured with a maximum time 910 for decoding RLC packets, At. The UE transmits ACKs or NACKs on the preconfigured uplink resources 912.

Figure 10:
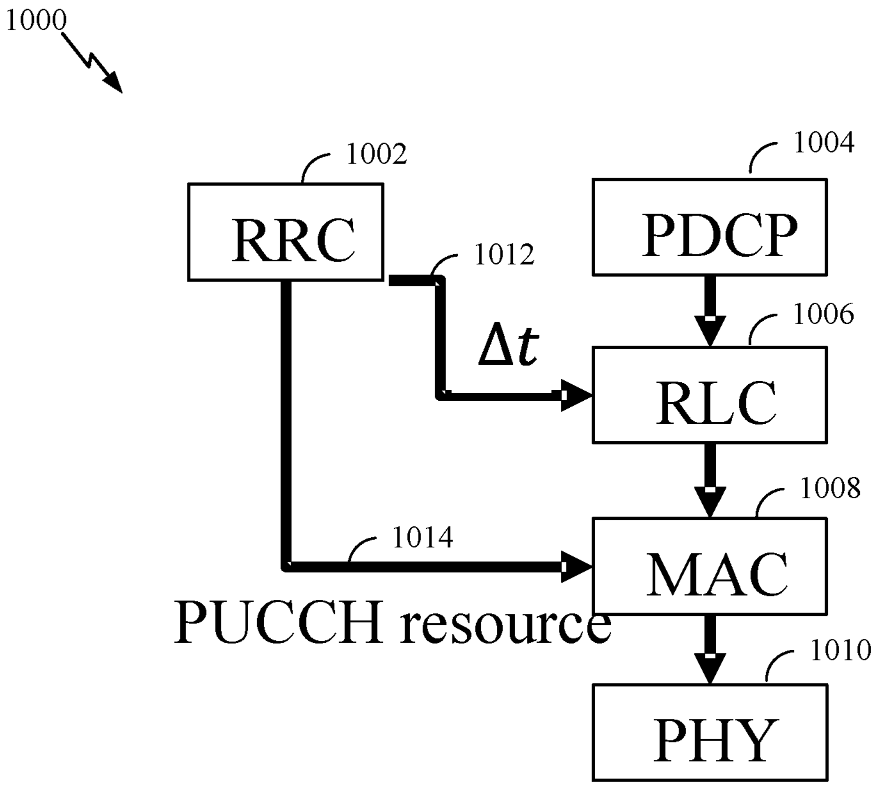
FIG. 10 is a block diagram illustrating an exemplary protocol stack operation, in accordance with aspects of the present disclosure.

FIG. 10 is a block diagram 1000 illustrating an exemplary protocol stack operation, in accordance with aspects of the present disclosure. In the exemplary protocol stack, an RRC layer 1002 of protocol stack of a BS (e.g., BS 110, shown in FIG. 1) configures a maximum time 1012 to decode RLC packets in an RLC layer 1006 of a protocol stack of a UE (e.g., UE 120, shown in FIG. 1). The RRC layer also configures a pre-configured PUCCH resource 1014 in a MAC layer 1008 of the protocol stack of the UE. A PDCP layer 1004 and a PHY layer 1010 of the protocol stack of the UE are also shown.

Figure 11:
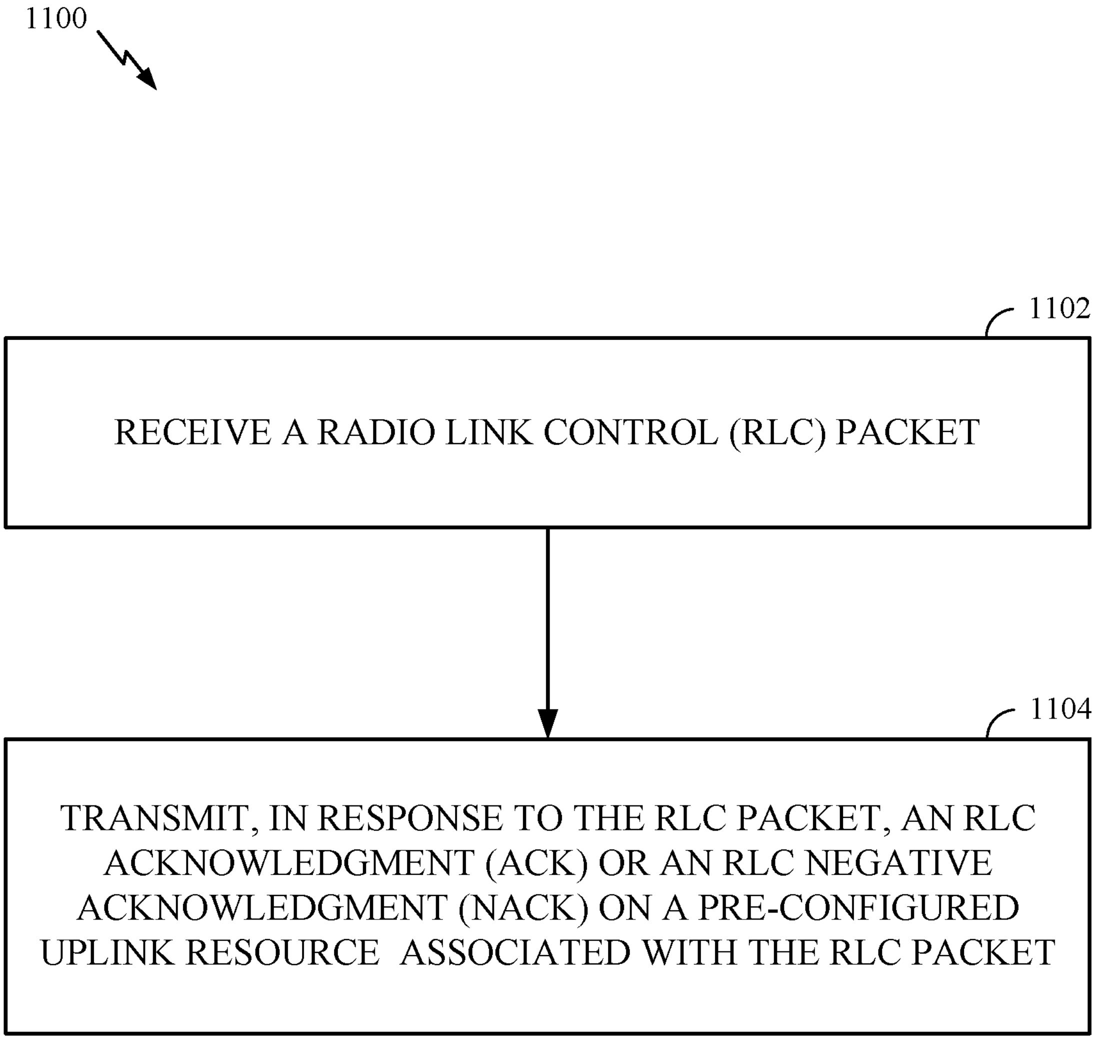
FIG. 11 is a flow diagram illustrating example operations for wireless communication by a UE, in accordance with certain aspects of the present disclosure.

FIG. 11 is a flow diagram illustrating example operations 1100 for wireless communication, in accordance with certain aspects of the present disclosure. The operations 1100 may be performed, for example, by a UE (e.g., the UE **120*a* in the wireless communication network 100). The operations 1100 may be implemented as software components that are executed and run on one or more processors (e.g., controller/processor 480 of FIG. 4). Further, the transmission and reception of signals by the UE in operations 1100 may be enabled, for example, by one or more antennas (e.g., antennas 452 of FIG. 4). In certain aspects, the transmission and/or reception of signals by the UE may be implemented via a bus interface of one or more processors (e.g., controller/processor 480**) obtaining and/or outputting signals.

The operations 1100 may begin, at block 1102, by receiving a radio link control (RLC) packet.

At block 1104, operations 1100 may continue by transmitting, in response to the RLC packet, an RLC acknowledgment (ACK) or an RLC negative acknowledgment (NACK) on a pre-configured uplink resource associated with the RLC packet.

According to aspects of the present disclosure, a UE performing operations 1100 may attempt to decode the RLC packet within a maximum time to decode the RLC packet, wherein the UE transmits the RLC ACK when the RLC packet is successfully decoded within the maximum time, and the UE transmits the RLC NACK when the RLC packet is not successfully decoded within the maximum time. In some such aspects, the UE may obtain a configuration indicating the maximum time to decode the RLC packet. In some such aspects, obtaining the configuration may include receiving the configuration from a base station (BS), and the RLC packet of block 1102 may be received from the BS.

In aspects of the present disclosure, a UE performing operations 1100 may receive a configuration indicating a relationship between resources for receiving the RLC packet and the pre-configured uplink resource.

According to aspects of the present disclosure, a UE performing operations 1100 may determine the pre-configured uplink resource, based on a maximum time to decode the RLC packet.

In aspects of the present disclosure a UE performing operations 1100 may attempt to decode the RLC packet within a maximum time to decode the RLC packet, wherein the UE does not transmit on the pre-configured uplink resource when the RLC packet is successfully decoded within the maximum time, and the UE transmits the RLC NACK when the RLC packet is not successfully decoded within the maximum time.

According to aspects of the present disclosure, the pre-configured uplink resource of block 1104 may include a physical uplink control channel (PUCCH) resource. For example, the pre-configured PUCCH may carry the RLC lay's ACK/NACK feedback. A network entity may require that the RLC layer decoding latency is within certain threshold value, such that the decoding is not expected to last in excessive of the threshold value after receiving the RLC packet with rateless code. Accordingly, upon receiving RLC packet, the UE decodes within the certain latency threshold, and/or transmits RLC feedback ACK/NACK on the pre-configured PUCCH resource.

In aspects of the present disclosure, the pre-configured uplink resource of block 1104 may include a physical uplink shared channel (PUSCH) resource. For example, the network entity may configure the MAC layer with a pre-configured PUCCH resource or configured grant PUSCH. The pre-configured PUCCH may be defined in a time frequency window that matches the RLC decoding timeline or pattern, in order to provide more flexibility of RLC layer decoding for different users. In some cases, different RLC layer PDU flows are assigned with different PUCCH resources.

Figure 12:
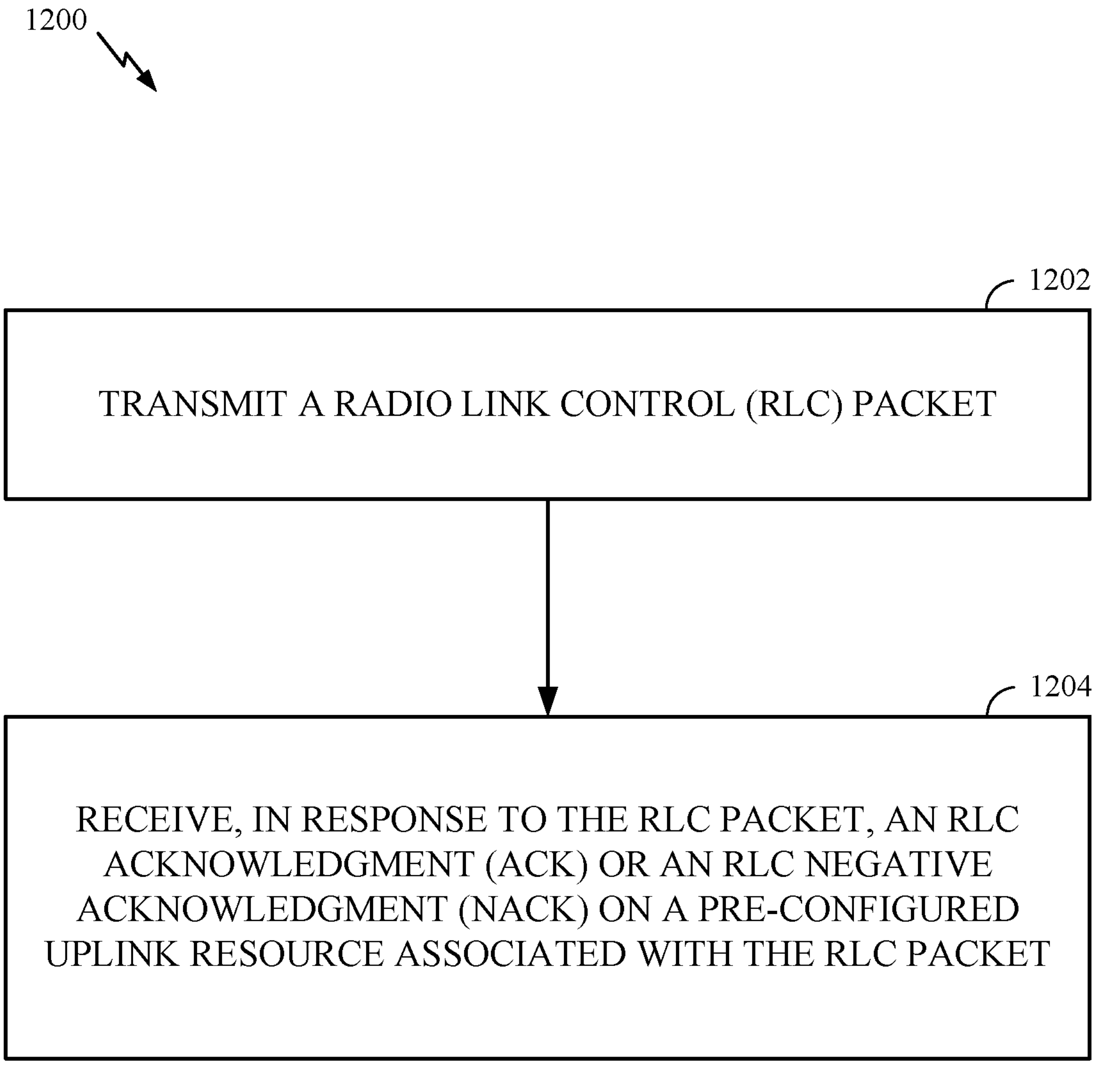
FIG. 12 is a flow diagram illustrating example operations for wireless communication by a BS, in accordance with certain aspects of the present disclosure.

FIG. 12 is a flow diagram illustrating example operations 1200 for wireless communication, in accordance with certain aspects of the present disclosure. The operations 1200 may be performed, for example, by a network entity (e.g., the BS 110*a* in the wireless communication network 100). The operations 1200 may be complementary to the operations 1100 performed by the UE. The operations 1200 may be implemented as software components that are executed and run on one or more processors (e.g., controller/processor 440 of FIG. 4). Further, the transmission and reception of signals by the BS in operations 1200 may be enabled, for example, by one or more antennas (e.g., antennas 434 of FIG. 4). In certain aspects, the transmission and/or reception of signals by the BS may be implemented via a bus interface of one or more processors (e.g., controller/processor 440) obtaining and/or outputting signals.

The operations 1200 may begin, at block 1202, by transmitting a radio link control (RLC) packet.

Operations 1200 may continue at block 1204 by receiving, in response to the RLC packet, an RLC acknowledgment (ACK) or an RLC negative acknowledgment (NACK) on a pre-configured uplink resource associated with the RLC packet.

According to aspects of the present disclosure, a BS performing operations 1200 may transmit a configuration indicating a maximum time to decode the RLC packet, wherein the BS receives the RLC ACK when the RLC packet is successfully decoded by a user equipment (UE) within the maximum time, and the BS receives the RLC NACK when the RLC packet is not successfully decoded by the UE within the maximum time. In some such aspects, the BS may transmit a configuration indicating a relationship between resources for receiving the RLC packet and the pre-configured uplink resource. In some such aspects, transmitting the configuration may include transmitting the configuration via a broadcast transmission directed to a plurality of user equipments (UEs).

In aspects of the present disclosure, a BS performing operations 1200 may determine the pre-configured uplink resource, based on a maximum time to decode the RLC packet.

According to aspects of the present disclosure, a BS performing operations 1200 may transmit a configuration indicating a maximum time to decode the RLC packet, wherein the BS does not receive a signal on the pre-configured uplink resource when the RLC packet is successfully decoded by a user equipment (UE) within the maximum time, and the BS receives the RLC NACK when the RLC packet is not successfully decoded by the UE within the maximum time.

In aspects of the present disclosure, the BS may receive the NACK on the pre-configured uplink resource, and the BS may trigger a re-transmission process for the RLC packet at an RLC protocol layer of the BS.

According to aspects of the present disclosure, the pre-configured uplink resource of block 1206 may include a physical uplink control channel (PUCCH) resource.

According to aspects of the present disclosure, the pre-configured uplink resource of block 1206 may include a physical uplink shared channel (PUSCH) resource.

FIG. 13 illustrates an example 1300 of staggering the feedback reporting of UEs, in accordance with certain aspects of the present disclosure. As shown, ACK or NACK reporting of more than one UE may be staggered in slots of a common window. In this configuration, the gNB pre-schedules the ACK/NACK reporting of different UEs in a staggered manner, such that different UEs (UE1 through UE8) or a group of UEs are scheduled under different slots (Slot1 through Slot8). In this way, no collision of physical layer resource between different UEs may occur.

In certain aspects, the scheduling information may be provided in RRC setup, or MAC-CE commands, or hybrid approach to indicate the scheduling slot. For example, The UEs may be configured such that different UEs are in different reported slots, which are not overlapping. Thus, the feedback reporting are non-overlapping across different users. In another configuration, the RRC configuration may define a window range, such that each window covers a preconfigured number of slots. As shown in FIG. 13, each window covers two slots. The windows 1-4 may be configured in RRC and the window may be selected according to MAC CE commands. Each UE is configured within a window and allowed to transmit on the PUCCH resource in the configured window. In the example shown in FIG. 13, each window is configured with a length for two slots and assigned with two users on each slot.

Figure 14:
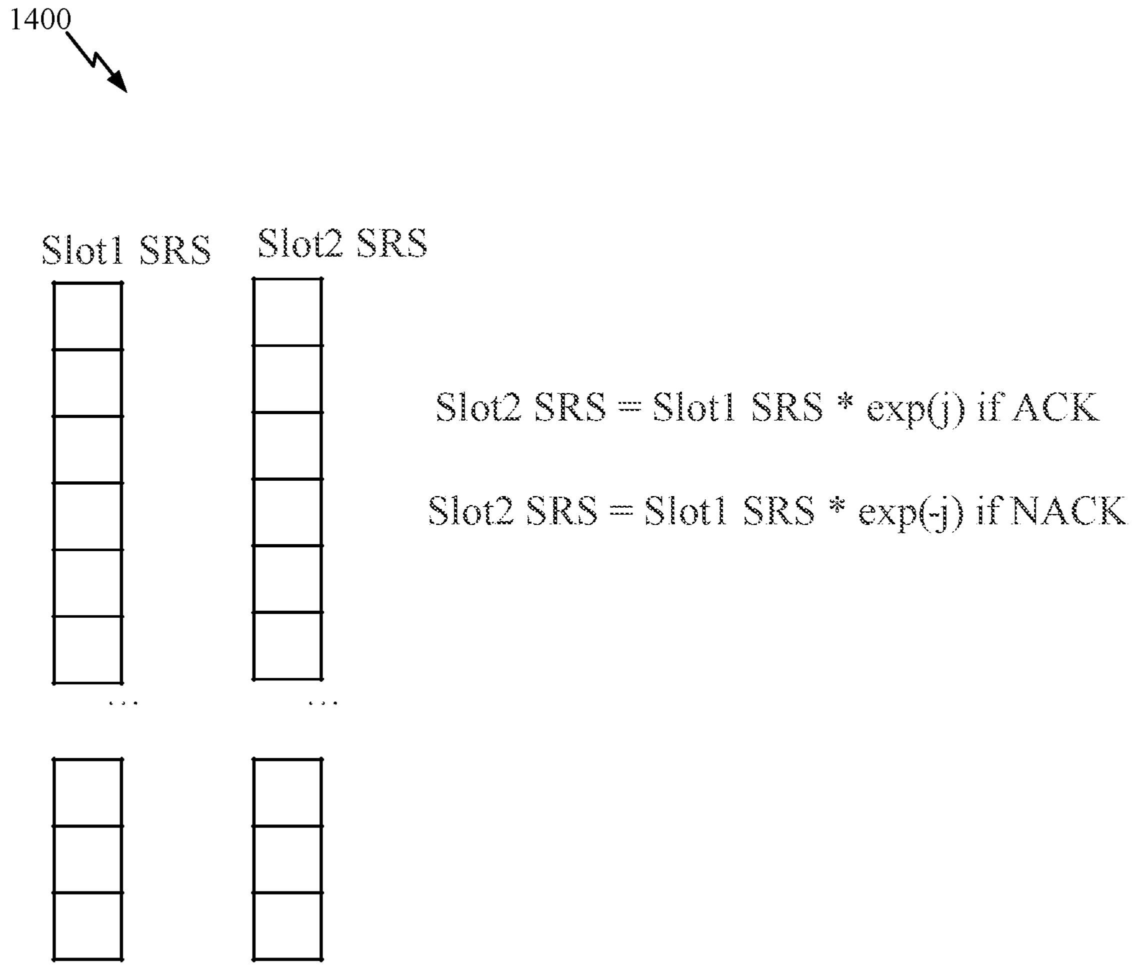
FIG. 14 illustrates an example of extending feedback carried on other physical layer signaling, in accordance of the present disclosure.

FIG. 14 illustrates an example 1400 of extending feedback carried on other physical layer signaling, in accordance of the present disclosure. Similar to but instead of (or in addition to) using a PUCCH, the feedback, such as RLC ACK or NACK, may be carried or indicated via other physical layer signaling. As shown, the feedback may be indicated in the phase of DMRS or SRS. The gNB may detect the feedback by identifying a phase offset of the SRS on different slots to ascertain the RLC ACK/NACK. In some cases, the feedback may be indicated in the phase of a scheduling request (SR), and other physical layer signaling.

Figure 15:
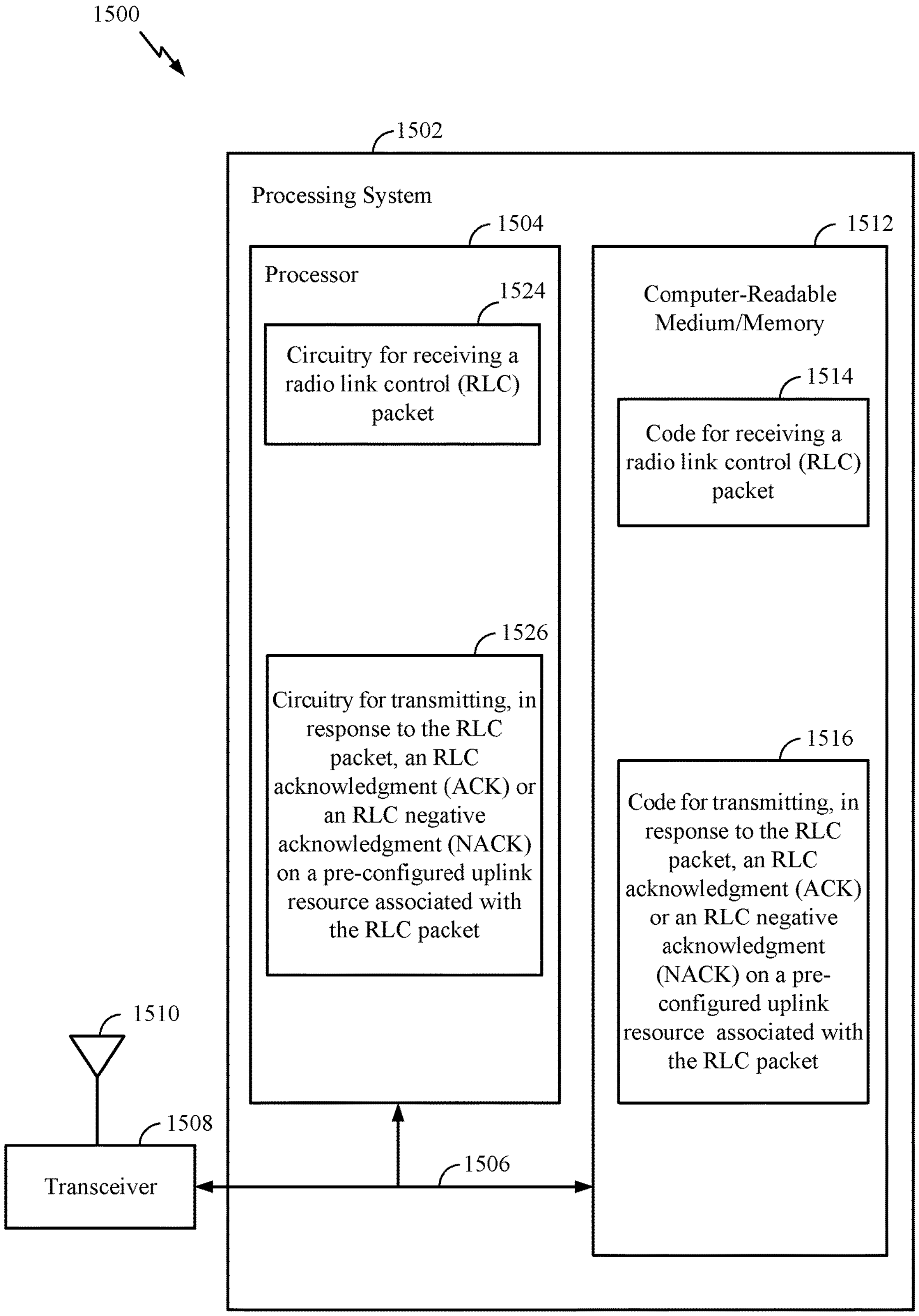
FIG. 15 illustrates a communications device that may include various components configured to perform the operations illustrated in FIG. 11, in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 11. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 11, or other operations for performing the various techniques discussed herein for radio link control (RLC) feedback, on the physical (PHY) layer, for transmissions. In certain aspects, computer-readable medium/memory 1512 stores code 1514 for receiving a radio link control (RLC) packet; and code 1516 for transmitting, in response to the RLC packet, an RLC acknowledgment (ACK) or an RLC negative acknowledgment (NACK) on a pre-configured uplink resource associated with the RLC packet. In certain aspects, the processor 1504 has circuitry configured to implement the code stored in the computer-readable medium/memory 1512. The processor 1504 includes circuitry 1524 for receiving a radio link control (RLC) packet; and circuitry 1526 for transmitting, in response to the RLC packet, an RLC acknowledgment (ACK) or an RLC negative acknowledgment (NACK) on a pre-configured uplink resource associated with the RLC packet.

Figure 16:
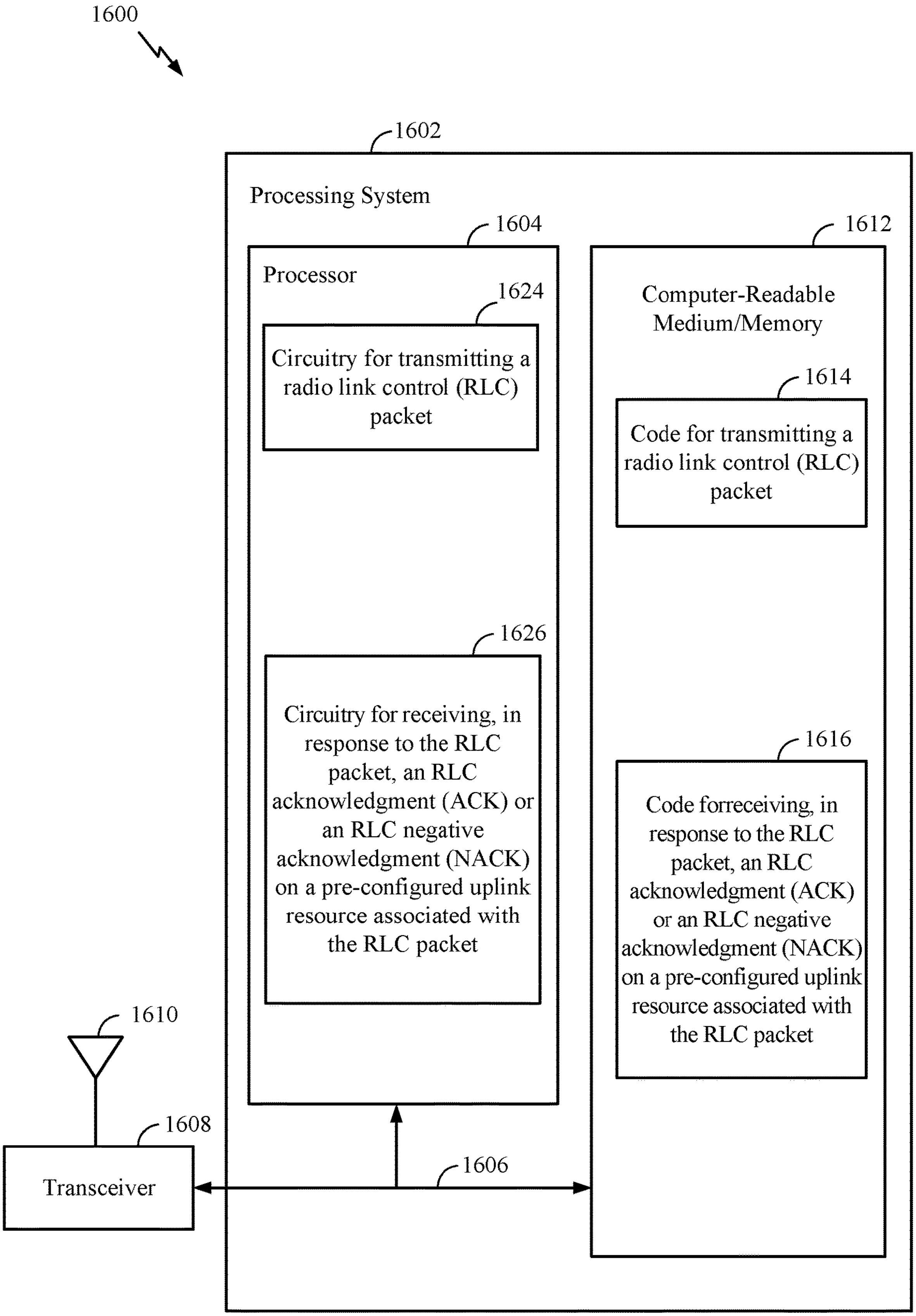
FIG. 16 illustrates a communications device that may include various components configured to perform the operations illustrated in FIG. 12, in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 12. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 12 transmitting a radio link control (RLC) packet, or other operations for performing the various techniques discussed herein for radio link control (RLC) feedback, on the physical (PHY) layer, for transmissions. In certain aspects, computer-readable medium/memory 1612 stores code 1614 for transmitting a radio link control (RLC) packet; and code 1616 for receiving, in response to the RLC packet, an RLC acknowledgment (ACK) or an RLC negative acknowledgment (NACK) on a pre-configured uplink resource associated with the RLC packet. In certain aspects, the processor 1604 has circuitry configured to implement the code stored in the computer-readable medium/memory 1612. The processor 1604 includes circuitry 1624 for transmitting a radio link control (RLC) packet; and circuitry 1626 for receiving, in response to the RLC packet, an RLC acknowledgment (ACK) or an RLC negative acknowledgment (NACK) on a pre-configured uplink resource associated with the RLC packet.

Example Aspects

Aspect 1: A method for wireless communications by a user equipment (UE), comprising: receiving a radio link control (RLC) packet; and transmitting, in response to the RLC packet, an RLC acknowledgment (ACK) or an RLC negative acknowledgment (NACK) on a pre-configured uplink resource associated with the RLC packet.

Aspect 2: The method of Aspect 1, further comprising: attempting to decode the RLC packet within a maximum time to decode the RLC packet, wherein the UE transmits the RLC ACK when the RLC packet is successfully decoded within the maximum time, and the UE transmits the RLC NACK when the RLC packet is not successfully decoded within the maximum time.

Aspect 3: The method of Aspect 1 or 2, further comprising: obtaining a configuration indicating the maximum time to decode the RLC packet.

Aspect 4: The method of Aspect 3, wherein obtaining the configuration comprises receiving the configuration from a base station (BS) and wherein the RLC packet is received from the BS.

Aspect 5: The method of any one of Aspects 1 to 4, further comprising: receiving a configuration indicating a relationship between resources for receiving the RLC packet and the pre-configured uplink resource.

Aspect 6: The method of any one of Aspects 1 to 5, further comprising: determining the pre-configured uplink resource, based on a maximum time to decode the RLC packet.

Aspect 7: The method of any one of Aspects 1 to 6, further comprising: attempting to decode the RLC packet within a maximum time to decode the RLC packet, wherein the UE does not transmit on the pre-configured uplink resource when the RLC packet is successfully decoded within the maximum time, and the UE transmits the RLC NACK when the RLC packet is not successfully decoded within the maximum time.

Aspect 8: The method of any one of Aspects 1 to 7, wherein the pre-configured uplink resource comprises a physical uplink control channel (PUCCH) resource or a physical uplink shared channel (PUSCH) resource.

Aspect 9: The method of any one of Aspects 1 to 7, wherein the pre-configured uplink resource is staggered with another uplink resource associated with an RLC packet of a different UE.

Aspect 10: The method of any one of Aspects 1 to 7, wherein the pre-configured uplink resource comprises an indication from at least one of a phase of a demodulation reference signal (DMRS), a phase of a sounding reference signal (SRS), or a phase of a scheduling request (SR).

Aspect 11: A method for wireless communications by a network entity, comprising: transmitting a radio link control (RLC) packet; and receiving, in response to the RLC packet, an RLC acknowledgment (ACK) or an RLC negative acknowledgment (NACK) on a pre-configured uplink resource associated with the RLC packet.

Aspect 12: The method of Aspect 11, further comprising: transmitting a configuration indicating a maximum time to decode the RLC packet, wherein the BS receives the RLC ACK when the RLC packet is successfully decoded by a user equipment (UE) within the maximum time, and the BS receives the RLC NACK when the RLC packet is not successfully decoded by the UE within the maximum time.

Aspect 13: The method of Aspect 11 or 12, further comprising: transmitting a configuration indicating a relationship between resources for receiving the RLC packet and the pre-configured uplink resource.

Aspect 14: The method of Aspect 13, wherein transmitting the configuration comprises transmitting the configuration via a broadcast transmission directed to a plurality of user equipments (UEs).

Aspect 15: The method of any one of Aspects 11 to 14, further comprising: determining the pre-configured uplink resource, based on a maximum time to decode the RLC packet.

Aspect 16: The method of any one of Aspects 11 to 15, further comprising: transmitting a configuration indicating a maximum time to decode the RLC packet, wherein the BS does not receive a signal on the pre-configured uplink resource when the RLC packet is successfully decoded by a user equipment (UE) within the maximum time, and the BS receives the RLC NACK when the RLC packet is not successfully decoded by the UE within the maximum time.

Aspect 17: The method of any one of Aspects 11 to 16, wherein the BS receives the NACK on the pre-configured uplink resource, and the method further comprises: triggering a re-transmission process for the RLC packet at an RLC protocol layer of the BS.

Aspect 18: The method of any one of Aspects 11 to 17, wherein the pre-configured uplink resource comprises a physical uplink control channel (PUCCH) resource or a physical uplink shared channel (PUSCH) resource.

Aspect 19: The method of any one of Aspects 11 to 17, wherein the pre-configured uplink resource is staggered with another uplink resource associated with an RLC packet of a different UE.

Aspect 20: The method of any one of Aspects 11 to 17, wherein the pre-configured uplink resource comprises an indication from at least one of a phase of a demodulation reference signal (DMRS), a phase of a sounding reference signal (SRS), or a phase of a scheduling request (SR).

Aspect 21: An apparatus for wireless communications by a user equipment (UE), comprising: a memory; and at least one processor coupled with the memory, the memory and the at least one processor configured to: receive a radio link control (RLC) packet; and transmit, in response to the RLC packet, an RLC acknowledgment (ACK) or an RLC negative acknowledgment (NACK) on a pre-configured uplink resource associated with the RLC packet.

Aspect 22: The apparatus of Aspect 21, wherein the at least one processor is further configured to: attempt to decode the RLC packet within a maximum time to decode the RLC packet, wherein the apparatus transmits the RLC ACK when the RLC packet is successfully decoded within the maximum time, and the apparatus transmits the RLC NACK when the RLC packet is not successfully decoded within the maximum time.

Aspect 23: The apparatus of Aspect 21 or 22, wherein the at least one processor is further configured to: obtain a configuration indicating the maximum time to decode the RLC packet.

Aspect 24: The apparatus of Aspect 23, wherein the at least one processor is configured to obtain the configuration by receiving the configuration from a base station (BS) and wherein the RLC packet is received from the BS.

Aspect 25: The apparatus of Aspect 21, wherein the at least one processor is further configured to: receive a configuration indicating a relationship between resources for receiving the RLC packet and the pre-configured uplink resource.

Aspect 26: The apparatus of Aspect 21, wherein the at least one processor is further configured to: determine the pre-configured uplink resource, based on a maximum time to decode the RLC packet.

Aspect 27: The apparatus of Aspect 21, wherein the at least one processor is further configured to: attempt to decode the RLC packet within a maximum time to decode the RLC packet, wherein the apparatus does not transmit on the pre-configured uplink resource when the RLC packet is successfully decoded within the maximum time, and the apparatus transmits the RLC NACK when the RLC packet is not successfully decoded within the maximum time.

Aspect 28: The apparatus of Aspect 21, wherein the pre-configured uplink resource is staggered with another uplink resource associated with an RLC packet of a different UE.

Aspect 29: The apparatus of Aspect 28, wherein the pre-configured uplink resource comprises at least one of: a physical uplink control channel (PUCCH) resource; a physical uplink shared channel (PUSCH) resource; or an indication from at least one of a phase of a demodulation reference signal (DMRS), a phase of a sounding reference signal (SRS), or a phase of a scheduling request (SR).

Aspect 30: An apparatus for wireless communications by a network entity, comprising: a memory; and at least one processor coupled with the memory, the memory and the at least one processor configured to: transmit a radio link control (RLC) packet; and receive, in response to the RLC packet, an RLC acknowledgment (ACK) or an RLC negative acknowledgment (NACK) on a pre-configured uplink resource associated with the RLC packet.

Aspect 31: The apparatus of Aspect 30, wherein the at least one processor is further configured to: transmit a configuration indicating a maximum time to decode the RLC packet, wherein the apparatus receives the RLC ACK when the RLC packet is successfully decoded by a user equipment (UE) within the maximum time, and the apparatus receives the RLC NACK when the RLC packet is not successfully decoded by the UE within the maximum time.

Aspect 32: The apparatus of Aspect 30, wherein the at least one processor is further configured to: transmit a configuration indicating a relationship between resources for receiving the RLC packet and the pre-configured uplink resource.

Aspect 33: The apparatus of Aspect 32, wherein the at least one processor is configured to transmit the configuration via a broadcast transmission directed to a plurality of user equipments (UEs).

Aspect 34: The apparatus of Aspect 30, wherein the at least one processor is further configured to: determine the pre-configured uplink resource, based on a maximum time to decode the RLC packet.

Aspect 35: The apparatus of Aspect 30, wherein the at least one processor is further configured to: transmit a configuration indicating a maximum time to decode the RLC packet, wherein the apparatus does not receive a signal on the pre-configured uplink resource when the RLC packet is successfully decoded by a user equipment (UE) within the maximum time, and the apparatus receives the RLC NACK when the RLC packet is not successfully decoded by the UE within the maximum time.

Aspect 36: The apparatus of Aspect 30, wherein the apparatus receives the NACK on the pre-configured uplink resource, and wherein the at least one processor is further configured to: trigger a re-transmission process for the RLC packet at an RLC protocol layer of the apparatus.

Aspect 37: The apparatus of Aspect 30, wherein the pre-configured uplink resource comprises a physical uplink control channel (PUCCH) resource.

Aspect 38: The apparatus of Aspect 30, wherein the pre-configured uplink resource comprises a physical uplink shared channel (PUSCH) resource.

Aspect 39: An apparatus for wireless communications, comprising: means for receiving a radio link control (RLC) packet; and means for transmitting, in response to the RLC packet, an RLC acknowledgment (ACK) or an RLC negative acknowledgment (NACK) on a pre-configured uplink resource associated with the RLC packet.

Aspect 40: An apparatus for wireless communications, comprising: means for transmitting a radio link control (RLC) packet; and means for receiving, in response to the RLC packet, an RLC acknowledgment (ACK) or an RLC negative acknowledgment (NACK) on a pre-configured uplink resource associated with the RLC packet.

Aspect 41: A computer-readable medium for wireless communications including instructions that, when executed by a processing system in a user equipment (UE), cause the processing system to perform operations including: receiving a radio link control (RLC) packet; and transmitting, in response to the RLC packet, an RLC acknowledgment (ACK) or an RLC negative acknowledgment (NACK) on a pre-configured uplink resource associated with the RLC packet.

Aspect 42: A computer-readable medium for wireless communications including instructions that, when executed by a processing system in a base station (BS), cause the processing system to perform operations including: transmitting a radio link control (RLC) packet; and receiving, in response to the RLC packet, an RLC acknowledgment (ACK) or an RLC negative acknowledgment (NACK) on a pre-configured uplink resource associated with the RLC packet.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11 and/or FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

The invention claimed is:

1. A method for wireless communications by a user equipment (UE), comprising:

receiving a radio link control (RLC) packet;

attempting to decode the RLC packet within a maximum time to decode the RLC packet; and transmitting, in response to the RLC packet, an RLC acknowledgment (ACK) or an RLC negative acknowledgment (NACK) on a pre-configured uplink resource associated with the RLC packet, wherein the UE transmits the RLC ACK in response to determining that the RLC packet is successfully decoded within the maximum time and wherein the UE transmits the RLC NACK on the pre-configured uplink resource in response to determining that the RLC packet is not successfully decoded within the maximum time.

2. The method of claim 1, further comprising:

obtaining a configuration indicating the maximum time to decode the RLC packet.

3. The method of claim 2, wherein obtaining the configuration comprises receiving the configuration from a network entity and wherein the RLC packet is received from the network entity.

4. The method of claim 1, further comprising:

receiving a configuration indicating a relationship between resources for receiving the RLC packet and the pre-configured uplink resource.

5. The method of claim 1, further comprising:

determining the pre-configured uplink resource, based on the maximum time to decode the RLC packet.

6. The method of claim 1, wherein the pre-configured uplink resource comprises a physical uplink control channel (PUCCH) resource or a physical uplink shared channel (PUSCH) resource.

7. The method of claim 1, wherein the pre-configured uplink resource is staggered with another uplink resource associated with an RLC packet of a different UE.

8. The method of claim 1, wherein the pre-configured uplink resource comprises an indication from at least one of a phase of a demodulation reference signal (DMRS), a phase of a sounding reference signal (SRS), or a phase of a scheduling request (SR).

9. A method for wireless communications by a user equipment (UE), comprising:

receiving a radio link control (RLC) packet;

attempting to decode the RLC packet within a maximum time to decode the RLC packet; and transmitting, in response to the RLC packet, an RLC acknowledgment (ACK) or an RLC negative acknowledgment (NACK) on a pre-configured uplink resource associated with the RLC packet, wherein the UE does not transmit on the pre-configured uplink resource in response to determining that the RLC packet is successfully decoded within the maximum time and wherein the UE transmits the RLC NACK on the pre-configured uplink resource in response to determining that the RLC packet is not successfully decoded within the maximum time.

10. A method for wireless communications by a network entity, comprising:

transmitting a radio link control (RLC) packet;

transmitting a configuration indicating a maximum time to decode the RLC packet; and receiving, in response to the RLC packet, an RLC acknowledgment (ACK) or an RLC negative acknowledgment (NACK) on a pre-configured uplink resource associated with the RLC packet, wherein the network entity receives the RLC ACK in response to determining that the RLC packet is successfully decoded by a user equipment (UE) within the maximum time and wherein the network entity receives the RLC NACK on the pre-configured uplink resource in response to determining that the RLC packet is not successfully decoded by the UE within the maximum time.

11. The method of claim 10, further comprising:

transmitting a configuration indicating a relationship between resources for receiving the RLC packet and the pre-configured uplink resource.

12. The method of claim 11, wherein transmitting the configuration comprises transmitting the configuration via a broadcast transmission directed to a plurality of user equipments (UEs).

13. The method of claim 10, further comprising:

determining the pre-configured uplink resource, based on the maximum time to decode the RLC packet.

14. The method of claim 10, wherein the network entity receives the NACK on the pre-configured uplink resource, and the method further comprises:

triggering a re-transmission process for the RLC packet at an RLC protocol layer of the network entity.

15. The method of claim 10, wherein the pre-configured uplink resource comprises a physical uplink control channel (PUCCH) resource or a physical uplink shared channel (PUSCH) resource.

16. The method of claim 10, wherein the pre-configured uplink resource is staggered with another uplink resource associated with an RLC packet of a different UE.

17. The method of claim 10, wherein the pre-configured uplink resource comprises an indication from at least one of a phase of a demodulation reference signal (DMRS), a phase of a sounding reference signal (SRS), or a phase of a scheduling request (SR).

18. A method for wireless communications by a network entity, comprising:

transmitting a radio link control (RLC) packet;

transmitting a configuration indicating a maximum time to decode the RLC packet; and receiving, in response to the RLC packet, an RLC acknowledgment (ACK) or an RLC negative acknowledgment (NACK) on a pre-configured uplink resource associated with the RLC packet, wherein the network entity does not receive a signal on the pre-configured uplink resource in response to the RLC packet being successfully decoded by a user equipment (UE) within the maximum time and wherein the network entity receives the RLC NACK on the pre-configured uplink resource in response to the RLC packet not being successfully decoded by the UE within the maximum time.

19. An apparatus for wireless communications by a user equipment (UE), comprising:

memory; and one or more processors coupled with the memory, the memory and the one or more processors configured to:

receive a radio link control (RLC) packet;

attempt to decode the RLC packet within a maximum time to decode the RLC packet; and transit, in reponse to the RLC packet, an RLC acknowledgement (ACK) or an RLC negative acknowledgment (NACK) on a pre-configured uplink resource associated with the RLC packet, wherein the UE transmits the RLC ACK in response to determining that the RLC packet is successfully decoded within the maximum time and wherein the UE transmits the RLC NACK on the pre-configured uplink resource in response to determining that the RLC packet is not successfully decoded within the maximum time.

20. The apparatus of claim 19, wherein the one or more processors are further configured to:

obtain a configuration indicating the maximum time to decode the RLC packet.

21. The apparatus of claim 20, wherein the one or more processors are configured to obtain the configuration by receiving the configuration from a network entity and wherein the RLC packet is received from the network entity.

22. The apparatus of claim 19, wherein the one or more processors are further configured to:

receive a configuration indicating a relationship between resources for receiving the RLC packet and the pre-configured uplink resource.

23. The apparatus of claim 19, wherein the one or more processors are further configured to:

determine the pre-configured uplink resource, based on the maximum time to decode the RLC packet.

24. The apparatus of claim 19, wherein the pre-configured uplink resource is staggered with another uplink resource associated with an RLC packet of a different UE.

25. The apparatus of claim 24, wherein the pre-configured uplink resource comprises at least one of:

a physical uplink control channel (PUCCH) resource;

a physical uplink shared channel (PUSCH) resource; or an indication from at least one of a phase of a demodulation reference signal (DMRS), a phase of a sounding reference signal (SRS), or a phase of a scheduling request (SR).

26. An apparatus for wireless communications by a network entity, comprising:

memory; and one or more processors coupled with the memory, the memory and the one or more processors configured to:

transmit a radio link control (RLC) packet;

transmit a configuration indicating a maximum time to decode the RLC packet; and receive, in response to the RLC packet, an RLC acknowledgment (ACK) or an RLC negative acknowledgment (NACK) on a pre-configured uplink resource associated with the RLC packet, wherein the network entity does not receive a signal on the pre-configured uplink resource in response to the RLC packet being successfully decoded by a user equipment (UE) within the maximum time and wherein the network entity receives the RLC NACK on the pre-configured uplink resource in response to the RLC packet not being successfully decoded by the UE within the maximum time.

27. The apparatus of claim 26, wherein the one or more processors are further configured to transmit a configuration indicating a relationship between resources for receiving the RLC packet and the pre-configured uplink resource.

28. The apparatus of claim 27, wherein the one or more processors are configured to transmit the configuration by transmitting the configuration via a broadcast transmission directed to a plurality of user equipments (UEs).

29. The apparatus of claim 26, wherein the one or more processors are further configured to determine the pre-configured uplink resource, based on the maximum time to decode the RLC packet.

30. The apparatus of claim 26, wherein the pre-configured uplink resource comprises a physical uplink control channel (PUCCH) resource or a physical uplink shared channel (PUSCH) resource.

* * * * *